United States Patent [19]
Murphy et al.

[11] Patent Number: 5,736,960
[45] Date of Patent: Apr. 7, 1998

[54] ATOMIC CLOCK AUGMENTED GLOBAL POSITIONING SYSTEM RECEIVERS AND GLOBAL POSITIONING SYSTEM INCORPORATING SAME

[75] Inventors: John H. Murphy, Churchill Boro, Pa.; Trent A. Skidmore, Athens, Ohio

[73] Assignee: Northrop Grumman Corporation, Los Angeles, Calif.

[21] Appl. No.: 530,553

[22] Filed: Sep. 19, 1995

[51] Int. Cl.$^6$ ............................. H04B 7/185; G01S 5/02
[52] U.S. Cl. ............................................... 342/357
[58] Field of Search ........................ 342/357; 364/449.7

[56] References Cited

U.S. PATENT DOCUMENTS

| | | | |
|---|---|---|---|
| 5,155,490 | 10/1992 | Spradley, Jr. et al. | 342/357 |
| 5,192,921 | 3/1993 | Chantry et al. | 331/3 |
| 5,319,374 | 6/1994 | Desai et al. | 342/387 |
| 5,364,093 | 11/1994 | Huston et al. | |
| 5,600,329 | 2/1997 | Brenner | 342/357 |

OTHER PUBLICATIONS

Proceedings of the Rural Electric Power Conference, New Orleans, May 3-5, 1992, No. 3, May, 1992, Institute of Electrical and Electronics Engineers, pp. D2.01-D2.10, XP000300323; M.N. Zeiler Integrated GIS and GPS For Mapping and Analysis of Electric Distribution Circvuits, see p. D2-4, line 29—p. D2-5, line 21.

Electronics and Communication Engineering Journal, vol. 7, No. 1, 1 Feb. 1995, pp. 11-22, XP000500767; Morgan-Owen G J et al: "Differential GPS Positioning", see p. 11, col. 2, line 20–p. 14, col. 1, line 36.

M.A. Sturza, *GPS Navigation Plane*, published by the Department of Transportation and the Department of Defense, DOT-VNTSC-RSPA-92-2/DOD-4650.5 (1992).

P. Misra and M. Pratt, *Role of the Clock in a GPS Navigation Receiver*, ATC Project Memorandum No. 42PM-SAT-NAV-0008, Massachusetts Institute of Technology, Lincoln Laboratory (May 1994).

*Primary Examiner*—Theodore M. Blum
*Attorney, Agent, or Firm*—Walter G. Sutcliff

[57] ABSTRACT

A GPS radio navigation system utilizes an atomic clock in each user's GPS receiver station and a ground reference station located at a fixed, precisely known position which determines GPS time from satellite information and transmits an absolute time signal together with time-of-flight information over a communications path of precisely known length to the user stations, each at a fixed position. Once the atomic clock in a GPS receiver has been set to the precise GPS time, the user station is free to maneuver for an extended period of time during which its position is calculated from pseudorange and time information received from as few as three satellites and the time maintained by its atomic clock.

14 Claims, 4 Drawing Sheets

ATOMIC CLOCK AUGMENTED GLOBAL POSITIONING SYSTEM RECEIVERS AND GLOBAL POSITIONING SYSTEM INCORPORATING SAME

BACKGROUND OF THE INVENTION

1. Field of the Invention

This invention relates to radio navigation systems, and in particular, to the Global Position System ("GPS") in which multiple satellites transmit position and time information which is received by user stations and processed to determine the time and location at the user station.

2. Background Information

The Global Positioning System (GPS) is a navigation system in which a constellation of orbiting satellites emit spread spectrum signals which contain information about the location of the satellites and the time at which the signal was transmitted.

The GPS Navigation System has been designed to use receivers in the users stations that are based on low-cost crystal oscillator technology, and are not dependent upon a highly accurate time piece to do the time of flight calculation of the signal transmission. This is accomplished by solving for the three dimensions of position and time from four or more satellite pseudorange measurements.

The GPS navigation system is owned and operated by the Department of Defense (DOD). It is considered to be a major military tool for precision location which can be used to locate assets and to assist in the accurate delivery of munitions to a target. As such, they have created a system that operates in two modes. One mode, the PPS or Precise Positioning Service mode, is highly secure and has tremendous accuracy (21 m horizontally, 29 m vertically, and 200 ns temporally). The other mode, the SPS or Standard Positioning Service mode, is publicly available but has a lower accuracy (100 m horizontally, 140 m vertically, and 340 ns temporally). The DOD controls the accuracy that the publicly available system can achieve. This is currently accomplished through selective availability (SA). There are two ways to degrade the system accuracy. The first way is introduce errors in GPS time and the second way is to introduce errors in the GPS satellite positions. At present, SA is on and the DOD is degrading the system performance by introducing errors in the GPS time.

The FAA has negotiated with the DOD about the use of the GPS navigation system by the aviation industry to perform non-precision and precision navigation. The publicly available mode of operation is nearly adequate to meet these needs. However, to allow navigation under extreme operating conditions some improvements/augmentations to the GPS navigation system are required.

The key augmentations to GPS being considered by the FAA are: the wide area augmentation system (WAAS) and local-area augmentations. WAAS consists of geostationary satellites and a supporting ground network used to increase the integrity, availability, and based on DOD approval, the accuracy of GPS. It is the goal of the FAA for WAAS to provide the primary means of navigation for all domestic operations down to Category I requirements (stated as 32 feet vertical and 110 feet horizontal error at the 200 foot decision height). The most-likely technologies being considered for local-area augmentations for Category II and III operations are a) code-phase differential GPS, b) pseudolites, which transmit a GPS-like signal, and c) kinematic carrier phase tracking, which obtains centimeter-level accuracy based on carrier phase tracking as opposed to just GPS code phase tracking.

It is a known fact that the introduction of an atomic clock in the GPS receiver can improve the navigation system availability. The introduction of a precise time piece in the receiver reduces the number of satellites needed to establish the location by one. That is, if the time is given by a precise clock then 3 or more satellite measurements can be used to establish the three dimensional position of the receiver. The augmentation of the GPS receiver by a precise clock therefore has a major impact on the performance parameters being used by the FAA to develop standards for satellite-based navigation in the national air space. Availability is defined as the percentage of the time that the GPS navigation services are available for use. Continuity of service is defined as the ability of the total system to provide acceptable performance throughout a phase of flight, given that the performance was acceptable at the initiation of the phase of flight. The possibility of performing this type of augmentation of GPS receivers for aviation navigation systems has not been seriously pursued or even considered up to now because commercially available, precision atomic clock costs have been too high.

Even if it is determined that a precision atomic clock should be used in the GPS receiver, the task remains to provide apparatus and a technique for synchronizing the precision atomic clock in the receiver with the time standard used by the satellites.

There is a need, therefore, for an improved GPS navigation system.

There is a particular need for a GPS navigation system which provides improved availability and continuity at a reasonable cost. There is also a need for apparatus and a technique for synchronizing the precision atomic clock used in the GPS receiver.

SUMMARY OF THE INVENTION

These needs and others are satisfied by the invention which is directed to a global positioning system in which the user stations are receivers incorporating a precision clock so that the position of the receiver can be determined using the position signals and time of position signals from as few as three satellites. In order to precisely set the time maintained by the precision clock, a synchronization means is provided at a precisely known fixed position close to the initial position of the receivers. This synchronization means calculates the absolute time established by a master station and transmitted to the satellites. Where the satellites introduce error into their time of position signals, the synchronizing means integrates the time signal continuously to remove this variation and provide a precision time signal accurately synchronized to the absolute time.

The user stations are initially positioned at a fixed, precisely known position relative to the fixed precisely known position of the synchronizing means. The synchronizing means then sends the precision time signal to the receiver together with time of flight information so that the receiver can accurately set its precision clock with respect to the absolute time. Once the precision clock in the receiver has been accurately set from a precision time signal with adjustment for the time of flight between the synchronizing means and the initial position of the receiver, the receiver can leave the initial position and maneuver. The subsequent positions of the receiver can then be calculated from the signals received from at least three satellites and the time maintained by its precision clock. The accuracy of these position calculations over time depends upon the stability of the clock and the inaccuracies of the initial setting of the clock. Use of an atomic clock set to within 3 ns of absolute time and having a drift of no more than 6 ns per day would maintain accuracy for Category I operations for up to about six hours.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
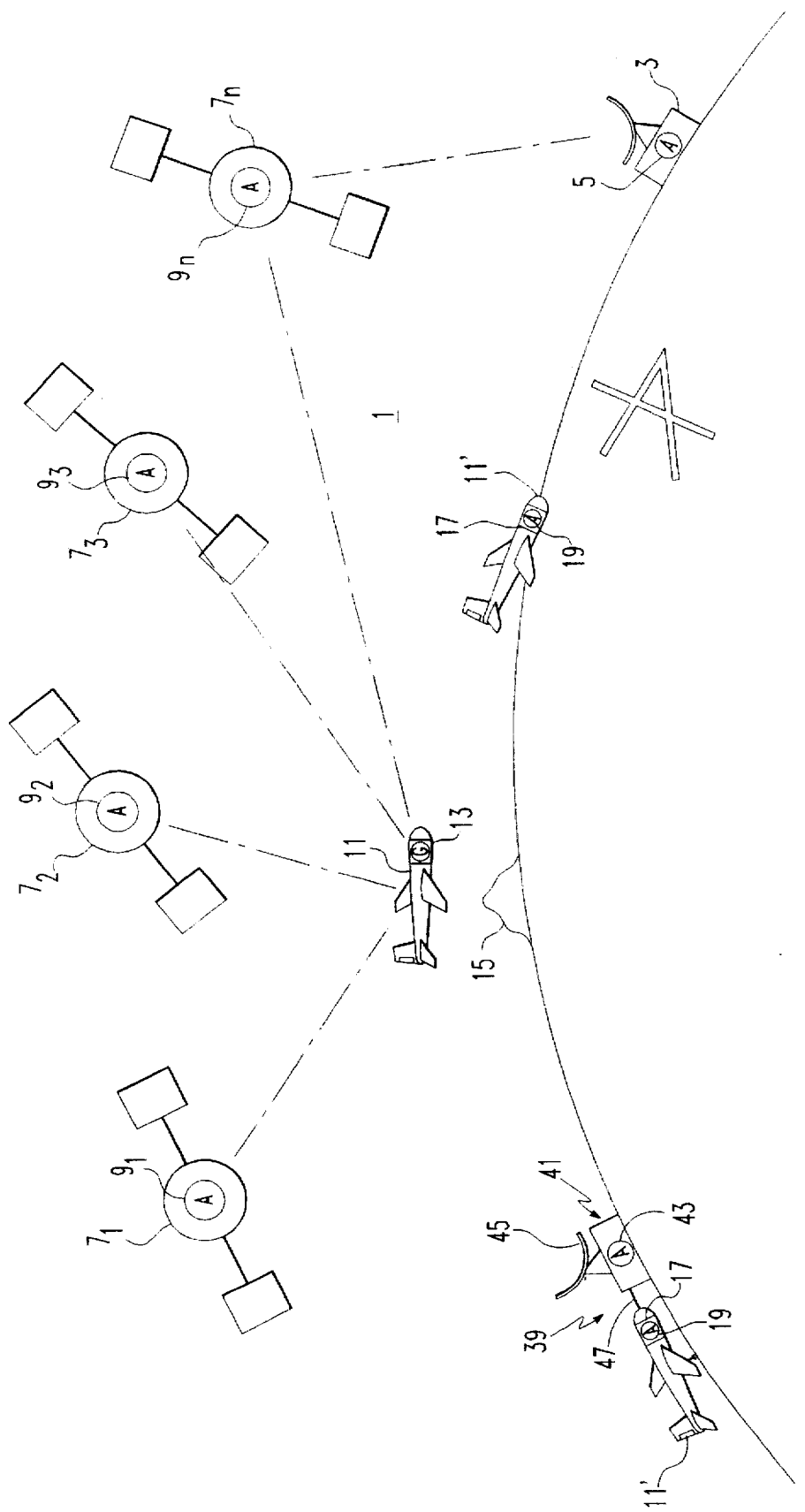
FIG. 1 is a schematic view of a GPS system incorporating the invention.

FIG. 1 illustrates schematically a Global Positioning System (GPS) 1 augmented in accordance with the invention. The conventional GPS system includes a master station 3 which maintains an absolute time standard using an atomic clock 5. This master station 3 transmits an absolute time standard signal to a number of orbiting satellites $7_1-7_n$ each of which also have an atomic clock $9_1-9_n$. Each of the satellites $7-7_n$ continually calculates its position and repetitively transmits a signal containing three dimensional satellite position information and time information. User stations, such as for example the aircraft 11, have a GPS receiver 13. The satellite signals to reach the GPS receiver 13 must be taken into account in order to determine the position of the user station 11 to the accuracy desired. Presently the user stations contain a crystal oscillator for use as a clock. Such a clock is not sufficiently accurate to make the time of flight calculations. Accordingly, the receiver station 13 must derive the time with the required accuracy from the satellite signal. Thus, the receiver station must solve for four unknowns, the three position coordinates (two horizontal and one vertical) and the time. This requires the receipt of signals from at least four satellites. While the number of satellites and their orbits are established in an attempt to optimize coverage, there can be times when signals from less than four satellites are available. This can be especially true for land-based GPS receivers wherein natural obstacles 15 such as mountains or man-made obstacles such as large buildings can block the receipt of signals, especially from satellites which are low on the horizon. In the case where signals from more than four satellites are received by the GPS receiver 13, the additional information is used, such as in a Kalman filter or a least squares estimation routine, to determine the location of the receiver with improved accuracy.

In accordance with the invention, the GPS system 1 is augmented by the use of a GPS receiver 17 with an atomic clock 19 in the user station 11'. We have discovered that a precise time standard such as provided by the atomic clock 19 in a GPS receiver significantly improves its vertical position accuracy. This comes about because when the atomic clock is used as a time reference, the position solution is uncoupled from the time solution which leads to an improvement in the position accuracy. Part of the improvement comes of the fact that we are now solving n equations in three unknowns as opposed to n equations in four unknowns. There is greater redundancy in the information, which when solved for, using for example a least squares or Kalman filter, leads to an improvement in the accuracy. The other part of the improvement comes from the fact that we can, in principle, set the atomic clock time more precisely than the time from the satellites can be instantaneously determined. The precision of the time piece is related to how closely the time can be set and the amount of drift in time that the physical device experiences.

Dilution of Precision (DOP) is a measure of the errors or accuracies in the position and time calculations in a GPS navigation system. Typically, a Horizontal Dilution of Precision (HDOP), a Vertical Dilution of Precision (VDOP), and a Time Dilution of Precision (TDOP) are of interest. The present invention provides an improvement in the instantaneous dilution of precision in all of these regimes which has particular impact for use of the augmented GPS navigation system for airborne vehicles. In particular, it has a tremendous influence on oceanic and enroute navigation which will impact the number of required geostationary satellites to achieve the availability needs for precision landing and radio navigation. It is also likely to lo influence the needs for pseudolites in the pseudolite augmented GPS system.

One of the benefits of using atomic clock augmentation is that it reduces the burden on the government in establishing a reliable navigation system. That is, the cost for this augmentation is placed on the users rather than on the public. Fortunately, developments in the production of small, moderately priced atomic clocks promise to make this practical.

The improvements in the dilution of precision provided by use of an atomic clock in a GPS receiver can be appreciated from the following: Let Y be the known changes in the pseudorange measurements, H be the measurement matrix (composed of direction cosines determined by the satellite geometries), and X be the unknown parameters. For the case of n-equations in 4 unknowns, Y is a (n×1) matrix, H is a (n×4) matrix, and x is a (4×1) matrix $$Y=HX \quad (1)$$

where $Y=[\rho_1\ \rho_2 \cdots \rho_n]^T$ $\rho_i$=the changes in the pseudorange measurement to the i th satellite (meters)

$X=[x\ y\ z\ b]^T$ b=the clock bias (meters) [note that the clock bias can be converted from a distance to time by dividing by the speed of light ($3\times10^8$ meters per second)], x, y, z=unknown location (meters), and $$H = \begin{bmatrix} \alpha_{1x} & \alpha_{1y} & \alpha_{1z} & 1 \\ \alpha_{2x} & \alpha_{2y} & \alpha_{2z} & 1 \\ \alpha_{3x} & \alpha_{3y} & \alpha_{3z} & 1 \\ \cdots & \cdots & \cdots & \cdots \\ \alpha_{nx} & \alpha_{ny} & \alpha_{nz} & 1 \end{bmatrix}$$

where $\alpha_{ix}$, $\alpha_{iy}$, and $\alpha_{iz}$ are the direction cosines between the unknown location (x, y, z) and the i th satellite.

For the case when we synchronize a clock to the GPS time, we need only to solve for the location. That is, we have n-equations in 3 unknowns, and a clock with some known bias b, where Y is a (n×1) matrix, H is a (n×3) matrix, X is a (3×1) matrix, and 1 is a (n×1) matrix.

$$Y = HX + b1 \tag{2}$$

where $Y = [\rho_1 \ \rho_2 \ \cdots \ \rho_n]^T$ $\rho_i$=the changes in the pseudorange measurement to the i th satellite (meters)

$X = [x \ y \ z]^T$ x, y, z =unknown location (meters)

b=the clock bias (meters)

$1 = [1 \ 1 \ \ldots \ 1]^T$ $$H = \begin{bmatrix} \alpha_{1x} & \alpha_{1y} & \alpha_{1z} \\ \alpha_{2x} & \alpha_{2y} & \alpha_{2z} \\ \alpha_{3x} & \alpha_{3y} & \alpha_{3z} \\ \cdots & \cdots & \cdots \\ \alpha_{nx} & \alpha_{ny} & \alpha_{nz} \end{bmatrix}$$

Since equations (1) and (2) represent the same GPS system operating under different scenarios, it should be no surprise that these equations are identical with the only difference being the interpretation of what is known and what is unknown.

The following solutions have been east using the least squares estimation approach to resolve the over specification resulting from n-equations in m-unknowns, where n>m. Similar results can be found using other estimation techniques. For n-equations in 4 unknowns, we have $$\text{cov}(X) = G\sigma_y^2 I_n$$

where $I_n$ is the (n×n) identity matrix $\sigma_y^2$ is the variance in the changes in the pseudorange [where the variance on each of the pseudoranges are assumed to be equal for each of the satellites] and $G = [H^T H]^{-1}$ where the vertical dilution of precision (VDOP) is given by $$VDOP = (G_{3,3})^{0.5} \tag{4}$$

the horizontal dilution of precision (HDOP) is given by $$HDOP = (G_{1,1} + G_{2,2})^{0.5} \tag{5}$$

and the time dilution of precision (TDOP) is given by $$TDOP = (G_{4,4})^{0.5} \tag{6}$$

for the n-equations in 3 unknowns, we have $$\text{cov}(X) = G\sigma_y^2 [I_n + k^2 H^T 1_n H \ G] \tag{7}$$

where $I_n$ is the (n×n) identity matrix $\sigma_y^2$ is the variance in the changes in the pseudorange (meters)

$1_n$ is an (n×n) matrix of ones $k^2 = (\sigma_b/\sigma_y)^2 = (\sigma_{bo}/\sigma_y)^2 + (\sigma_{bs}/\sigma_y)^2 (t - t_0)/t_0$ $\sigma_b$ is the variance in the temporal bias (meters)

$\sigma_{bo}$ is the initial variance in the temporal bias (meters)

$\sigma_{bs}$ is the drift variance in the temporal bias (meters)

$t_0$ is the time at initialization (seconds)

t is the time (seconds)

and $G = [H^T H]^{-1}$ where the vertical dilution of precision is given by $$VDOP = (G[I_n + k^2 H^T 1_n HG]_{3,3})^{0.5} \tag{8}$$

and the horizontal dilution of precision is given by $$HDOP = (G[I_n + k^2 H^T 1_n H \ G]_{1,1} + G[I_n + k^2 H^T 1_n HG]_{2,2})^{0.5} \tag{9}$$

The difference between equations (4) and (8) lead to the improvement in instantaneous VDOP that comes from the use of a precise time standard. Likewise the difference between equations (5) and (9) lead to the small improvement in instantaneous HDOP that also comes from the use of a precise time standard.

Figure 2:
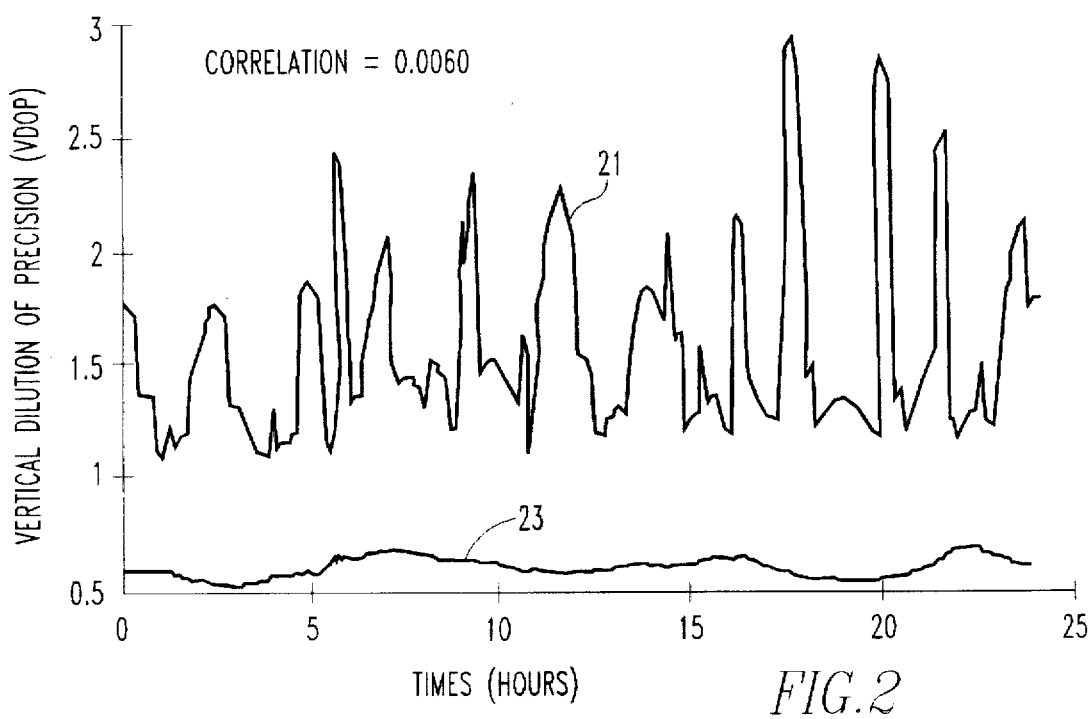
FIG. 2 is a plot comparing vertical dilution of precision (VDOP) versus time for a GPS receiver with the invention to one without the invention during an example of enroute navigation.
Figure 3:
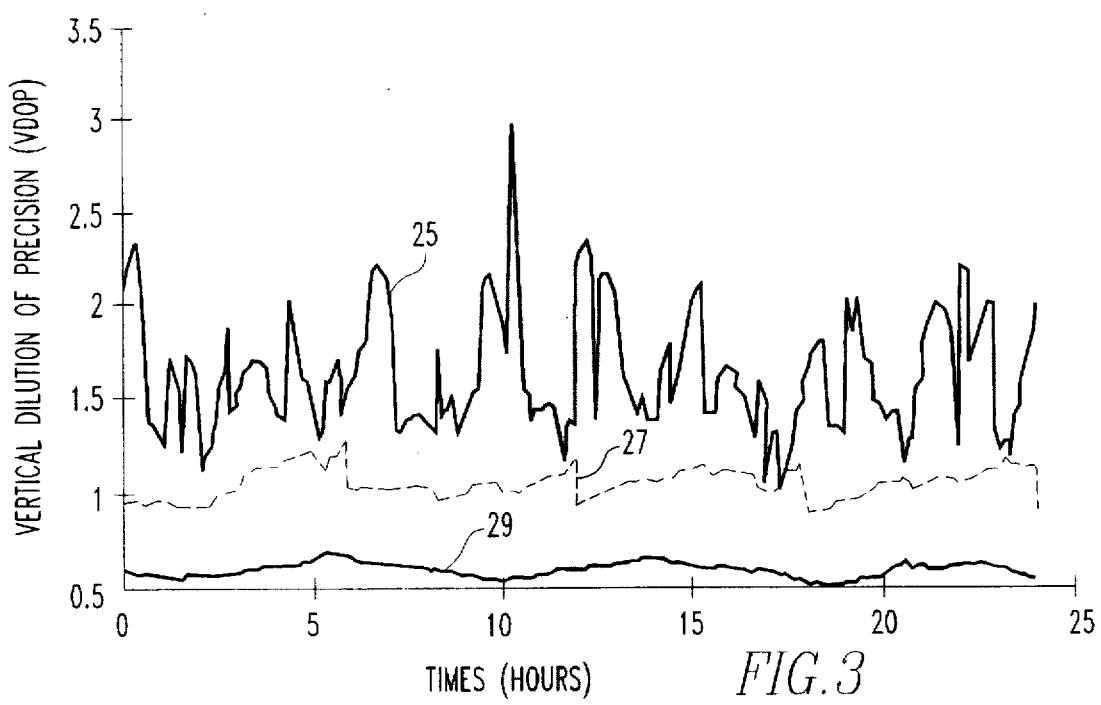
FIG. 3 is a plot comparing VDOP versus time for a precision landing for a GPS receiver, without the invention, with the invention and with a perfect clock.

In conjunction with Ohio University, a simulator was developed based on their Satellite Coverage Research Analysis Model (SCRAM) code which calculates the DOPs of GPS receivers with and without precision time references. This model allows investigation of GPS receiver accuracies and dilution of precision characteristics at a specific location or on a route between two locations for a period of time of interest. FIG. 2 illustrates a comparison of VDOPs for enroute navigation between Pittsburgh, Pa. and Seattle, Wash. using a mask angle (minimum angle above the horizon to visible satellites with acceptable signal errors) of 5 degrees. The curve 21 is the instantaneous VDOP for a code—phase GPS receiver without an atomic clock and assuming a measurement accuracy of $\sigma_y = 100$ m (300 ns). The curve 23 is the instantaneous VDOP for a GPS receiver with an atomic clock that is resynchronized every 5.2 hours to within 3 ns $[(\sigma_{bo}/\sigma_y)^2 = 10^{-4}]$ of absolute time and drifts 6 ns per day $[(\sigma_{bs}/\sigma_y)^2 = 4 \times 10^{-4}]$ VDOP calculations were also performed over a 24 hour period for Seattle, Wash. to illustrate the impact of an atomic clock during a precision landing. FIG. 3 illustrates this case. The atomic clock was assumed to be synchronized to within 3 ns and drifts on an average of no more than 6 ns per day. Thus, $\sigma_y^2 = 2$ m (6 ns) which corresponds to a code phase differential GPS system, the expected mode of operation during a precision landing. A mask angle of 7.5 decrees was used. The curve 25 is the instantaneous VDOP for a GPS receiver without an atomic clock, assuming a differential code phase GPS receiver which has a $\sigma_y = 2$ m (6 9 ns). The curve 27 is the instantaneous VDOP for a GPS receiver with an atomic clock that is resynchronized every 6 hours to within 3 ns $[(\sigma_{bo}/\sigma_y)^2 = 0.25]$ of absolute time and drifts 6 ns per day $[(\sigma_{bs}/\sigma_y)^2 = 1]$. The curve 29 is the instantaneous VDOP for a GPS receiver with a perfect clock. That is, an atomic clock that has no drift and is exactly synchronized to absolute time.

Figure 4:
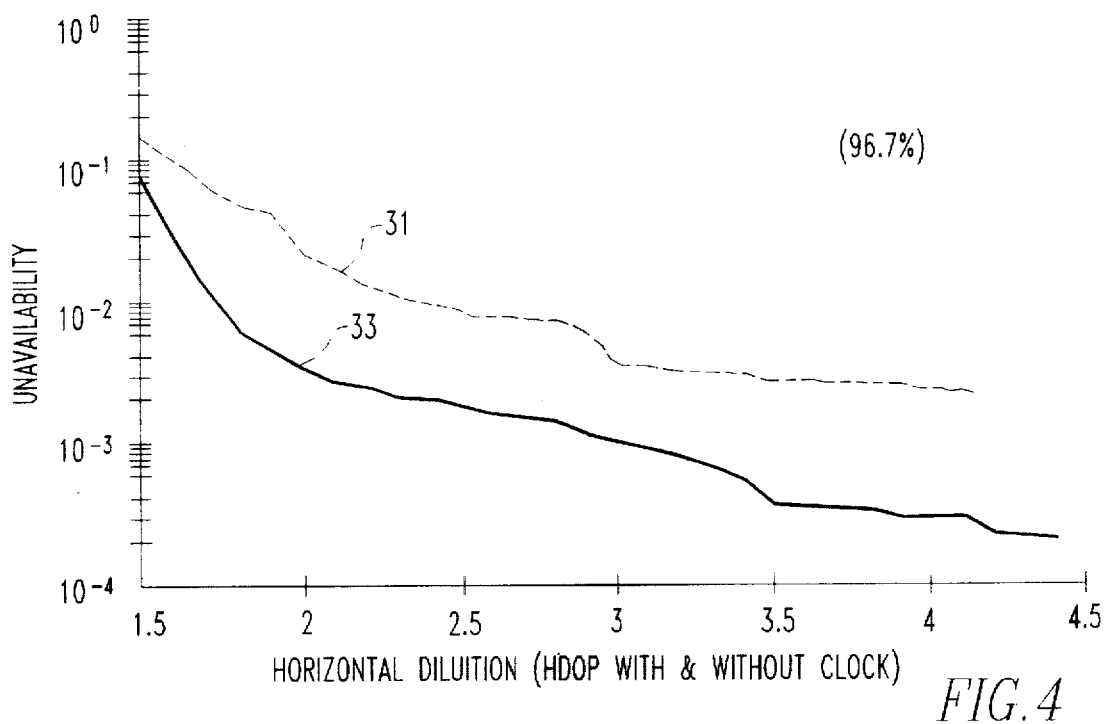
FIG. 4 is a plot comparing unavailability versus horizontal dilution of precision (HDOP) for a precision landing without an atomic clock and one with a perfect clock.

Availability improvement is a central result that comes from clock augmentation of GPS receivers. To verify this we constructed a computer model based on the SCRAM code of the GPS location system to determine the magnitude of this improvement in availability. For the case we studied, we used a Markov model for the state probabilities, in which the probability of no failures is 0.659858, the probability of a single failure is 0.230474, and a probability of two failures is 0.076341. This gives a 96.7% accuracy of having 22 or more satellites. FIG. 4 illustrates the impact of a perfect clock on the unavailability (one minus the availability) plotted against the instantaneous HDOP. This plot was generated for precision landing at the Seattle Airport over a 24 hour period assuming a mask angle of 10 degrees. The curve 31 is for a GPS receiver without a precision clock and the curve 33 illustrates the results for a receiver augmented with an atomic clock. This figure illustrates that the clock has the potential to decrease the unavailability by between a factor of 2 and 10 for HDOPs between 1.5 and 4.5. This is of particular importance to enroute and oceanic navigation.

Figure 5:
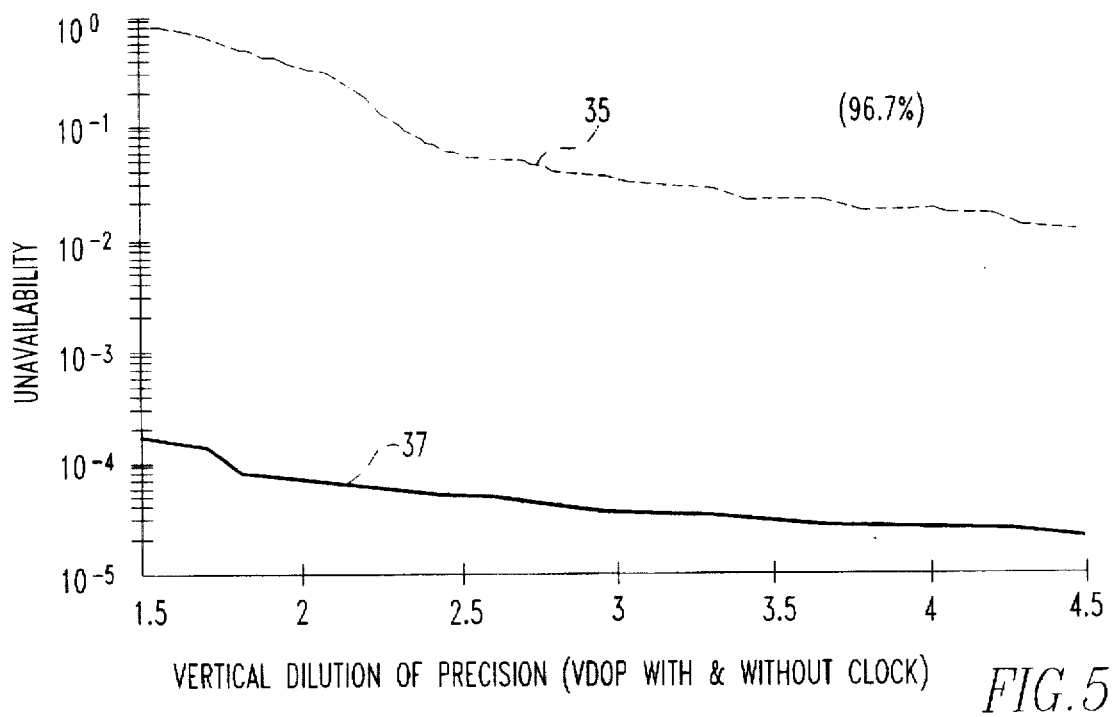
FIG. 5 is a plot comparing unavailability versus VDOP for a precision landing without an atomic clock and with a perfect clock.

More striking is the effect on unavailability when plotted against VDOP. FIG. 5 illustrates these results for a precision landing at Seattle airport using a mask angle of 10 degrees. The VDOP and unavailability are determined over a specified 24 hour period at the Seattle airport based upon the calculated satellite geometries. The curve 35 is the unavailability versus VDOP for a GPS receiver without a perfect clock. The curve 37 is the unavailability versus VDOP for a GPS receiver with a perfect clock. It can be seen that the atomic clock augmentation improves the unavailability by over 3 orders of magnitude for a VDOP between 1.5 and 4.5. Thus, we see that under Special Category 1 (SCAT-I) precision approach conditions (VDOP~4), the unavailability for a standard GPS receiver is 2.0%, whereas when augmented by a perfect clock the unavailability approaches 0.003%. (This implies that the availability for SCAT-I landings goes from 98% to 99.997%.) Furthermore, under CAT-I landing conditions (VDOP~2.3), we find that the unavailability for a standard GPS receiver is 13%, whereas when augmented by a perfect clock the unavailability approaches 0.006%. (This implies that the availability for CAT-I landings goes from goes from 87% to 99.94%.) Current thinking at a FAA is that a target availability is 99.999% for enroute navigation and they will tolerate an availability as large as 99.9% for precision approaches under CAT-I conditions.

Current instrument landing systems (ILS) for CAT-I landings at single ILS airports (~500 in the U.S.) have an availability of 95–99.5%, and for multiple ILS airports (~120 in the U.S.) have an availability of 99.95–99.998%, and for multiple-ILS airports (~55 in the U.S.) have availabilities greater than 99.999%.

Thus, we see that the availability for SCAT-I precision approaches with GPS receivers without an atomic clock is comparable to CAT-I precision approaches at single-ILS airports. However, the GPS navigation system is inadequate for precision approaches at airports requiring 99.95% or better availability without some augmentation (precision clocks, pseudolites, or geostationary satellites). Clock augmentation of the GPS navigation system promises to extend CAT-I landings to airports requiring 99.998% without additional augmentation from either pseudolites or geostationary satellites. This implies that in the U.S. CAT-I landings can be made at 92% of the airports for airplanes operating with only GPS receivers augmented by precision clocks.

Thus, it can be seen that a GPS receiver with a perfect clock could have a significant improvement in the dilutions of precision. Furthermore, it has been shown that even with a real atomic clock which is resynched to within 3 ns every six hours a significant improvement in the accuracy can be achieved. The challenge, therefore, is to devise a means of precision time transfer which permits realization of the types of improvements discussed above.

In accordance with the invention, a system 39 for synchronizing the atomic clocks 19 in the user vehicles 11' is provided. The synchronizing system 37 includes a ground reference station 41 located at a fixed, precisely known location. Precision time acquisition at ground reference stations is a well known art. Briefly, the ground reference station comprises a multi-channel GPS receiver and an atomic clock 43. The reference station antenna 45 is located at a surveyed location. The accuracy of the survey determines the accuracy of the absolute time established at the reference station 41. Subcentimeter level resolution of the reference antenna location is possible with current GPS-based surveying equipment. The reference station 41 monitors all GPS satellites which are in view. From their almanac information and knowledge of the reference station antenna location, a continual stream of estimates of the GPS time can be established from the solution of the location equations at the ground reference station 41. These estimates are continually fed to a Kalman filter, along with the current ground reference time to establish the absolute time. The absolute time output from the Kalman filter is used to condition the ground reference station atomic clock 43. The ground reference station atomic clock 43 is therefore being corrected for its drift in time on a continual basis. Also, it was indicated that in the SPS mode, the satellites apply a bias to the time signal to degrade accuracy. The ground reference station 41 by integrating the calculated time signal continually over time can remove this bias, and generate accurate absolute time information.

Figure 6:
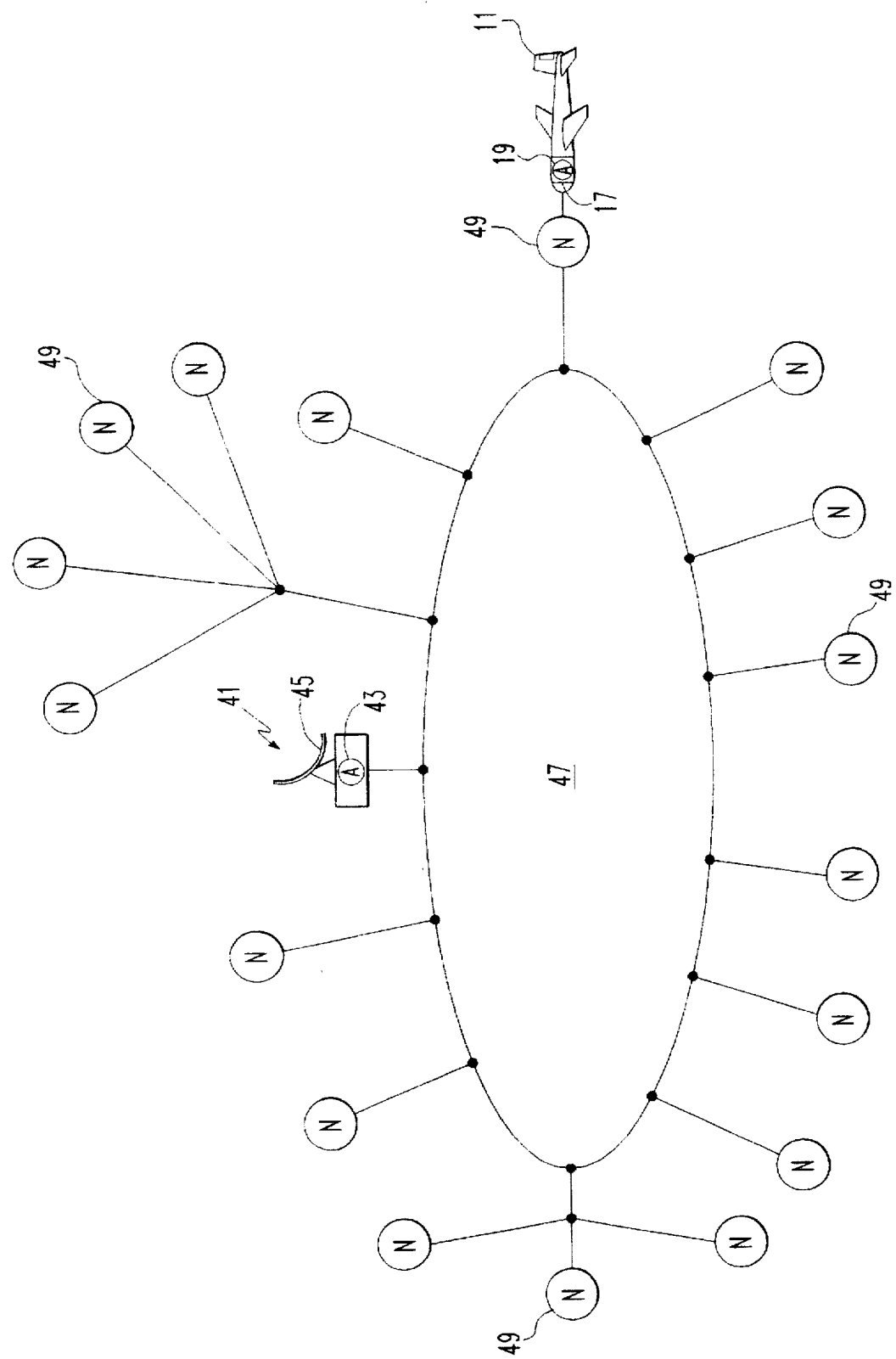
FIG. 6 is a schematic diagram of a system for setting the atomic clocks in receiver stations of a GPS in accordance with the invention.

The reference station atomic clock time becomes the absolute time which needs to be transferred to the GPS receivers 17 in the user stations 11' before they depart on a mission. The transfer of the precision time signal generated by the ground reference station 41 can be accomplished either wirelessly or over-the-wire. Wireless time transfer requires corrections for atmospheric conditions, direct path, multi-path and other possible sources of error. Because of the large number of error sources, this approach is not preferred. In the preferred embodiment of the invention, an over-the-wire communications network 47 is used to transfer the precision time signal between the ground reference station 41 and the user stations 11'. As can be seen from FIG. 6, the communications network 47 connects the ground reference station 41 with a number of nodes 49 to which user stations 11' can be connected. This type of time transfer requires a precision determination of the path between the reference station 41 and each individual node 49. For a 0.1 to 1 ns accuracy, it is recommended that measurement of the communication paths be to precisions of 10 to 100 cm. Precision time transfer is achieved through the emission of a timing pulse along with a correction message (almanac) which defines the time-of-flight corrections for each of the nodes 49 in the communications network 47. The media for the over-the-wire time transfer needs to be taken into consideration. For a very rapid pulse and almanac information transfers, fiber optic cable is preferred. However, for airport applications where time transfer is done continually, and the almanac information is small, over-the-wire transfer via conducting materials can be considered. However, thermal effects on the properties of the conductor influence the time transfer and have to be accounted for in these alternative over-the-wire time transfer systems. The precision time signal transmitted by the ground reference station 41 is used by the user stations 11' to establish the time for on-board atomic clocks 19 in the GPS receiver 17. Simultaneously, an internal clock counter is set to the time of transfer plus the time delay appropriate to the node at which the GPS receiver is attached. Using this methodology, time transfers of sub-nano seconds are possible. The accuracy of the time transfer is therefore constrained to the accuracy of the absolute time determination at the ground reference station 41.

Once the atomic clock 19 in a user station 11' such as an aircraft has been set using the precision time signal and almanac received at an associated node 49 over the communications network 47, the user station/aircraft disconnects from the communications network and can maneuver. As indicated previously, in the case of an aircraft 11 with its atomic clock 17 set to within 3 ns of absolute time by information received from the ground reference station 39, and assuming a drift of 6 ns per day the accuracy of the position calculations made by the receiver in the user stations/aircraft would be suitable for a Category I approach at an airport for up to 6 hours after the user station/aircraft disconnected from the communication system 43.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. A global positioning system comprising:

a plurality of satellites each repetitively transmitting signals indicating three dimensional satellite position information and time information;

master station means for providing an absolute time reference and position reference to said satellites;

a user station comprising a precision clock initially set by a precision time signal to a precise time relative to the absolute time reference, means for receiving said signals generated by at least three of said satellites, and processing means for repetitively generating a user position signal representing a three dimensional position of said user station using satellite position information from at least three satellites and time information from said precision clock after said precision clock is initially set; and synchronizing means comprising reference means at a fixed, known location generating said precision time signal from said signals transmitted by at least three of said satellites and means transmitting said precision time signal to said user station to provide the initial clock setting when the user station is located at a precisely known position relative to said fixed, known position of said synchronizing means, said user station further including means for moving from said precisely known position while said processing means continues to repetitively generate said user position signal in response to time information from the precision clock and position information from the satellites.

2. The global positioning system of claim 1 wherein said processing means comprises calculating means solving only for three dimensions of position using said signals from at least three satellites and using rime from said precision clock.

3. The global positioning system of claim 1 wherein said processing means comprises calculating means solving only for three dimensions of position using said signals from at least three satellites and using time from said precision clock and said signals indicating time information from said satellites.

4. The global positioning system of claim 1 wherein said satellites include means applying a time varying bias to said signals indicating time and position information, and wherein said synchronizing means comprises means removing said time varying bias from said signals indicating time information received from each satellite in generating said precision time signal.

5. The global positioning system of claim 1 comprising a plurality of user stations each initially located at a different precisely known position relative to said synchronizing means and wherein said synchronizing means comprises means for transmitting to each user station a precision time signal for updating said precision clock.

6. The global positioning system of claim 1 wherein said precision clock comprises an atomic clock.

7. The global positioning system of claim 6 wherein said precision clock comprises an atomic clock with a drift of no more than about 6 ns per day.

8. The global positioning system of claim 7 wherein said synchronizing means comprises means generating said precision time signal with an accuracy of about 3 ns with respect to said absolute time reference.

9. Apparatus for use with a global positioning system comprising a plurality of satellites each repetitively transmitting signals indicating three dimensional satellite position information and time information; and master station means for providing an absolute time and position reference to said satellites, said apparatus comprising:

a user station comprising a precision clock initially set by a precision time signal to a precise time relative to the absolute time reference, means for receiving said signals generated by at least three of said satellites, and processing means for repetitively generating a user position signal representing a three dimensional position of said user station using time from said precision clock, and satellite position information from at least three satellites and time information from said precision clock after said precision clock is initially set; and synchronizing means comprising means at a fixed, known location generating said precision time signal from said signals transmitted by at least three of said satellites and means transmitting said precision time signal to said user station to provide the initial clock setting when the user station is located at a precisely known position relative to said fixed, known position of said synchronizing means, said user station further including means for moving from said precisely known position while said processing means continues to repetitively generate said user position signal.

10. The apparatus of claim 9 wherein said processing means also utilizes said time information from said satellites in generating said user position signal.

11. The apparatus of claim 9 for use with said global positioning system in which said satellites apply a time varying bias to said signal indicating time information, wherein said synchronizing means comprises removing said time varying bias from said signals indicating time information received from each satellite in generating said precision time signal.

12. The apparatus of claim 9 comprising a plurality of user stations each initially located at a different precisely known position relative to said synchronizing means and wherein said synchronizing means comprises means for transmitting to each user station a precision time signal for updating said precision dock.

13. The apparatus of claim 9 wherein said precision clock comprises an atomic clock with a drift of no more than about 6 ns per day.

14. The apparatus of claim 13 wherein said synchronizing means comprises means generating said precision time signal with an accuracy of about 3 ns with respect to said absolute time reference.

* * * * *